United States Patent
Seidel

(10) Patent No.: US 9,056,977 B2
(45) Date of Patent: Jun. 16, 2015

(54) STABILISED POLYCARBONATE COMPOSITIONS WITH BLENDS OF SILICA AND AN INORGANIC ACID

(71) Applicant: BAYER INTELLECTUAL PROPERTY GMBH, Monheim (DE)

(72) Inventor: Andreas Seidel, Dormagen (DE)

(73) Assignee: BAYER INTELLECTUAL PROPERTY GMBH, Monheim (DE)

( * ) Notice: Subject to any disclaimer, the term of this patent is extended or adjusted under 35 U.S.C. 154(b) by 181 days.

(21) Appl. No.: 13/659,715

(22) Filed: Oct. 24, 2012

(65) Prior Publication Data

US 2013/0116367 A1    May 9, 2013

(30) Foreign Application Priority Data

Oct. 26, 2011  (EP) .................................... 11186664

(51) Int. Cl.
- C08L 67/02    (2006.01)
- C08K 3/24    (2006.01)
- C08K 3/36    (2006.01)
- C08L 69/00    (2006.01)

(52) U.S. Cl.
CPC . C08L 69/00 (2013.01); C08K 3/36 (2013.01); C08L 67/02 (2013.01)

(58) Field of Classification Search
USPC .......................................... 524/492, 493, 151
See application file for complete search history.

(56) References Cited

U.S. PATENT DOCUMENTS

| 5,420,181 | A | 5/1995 | Eichenauer et al. |
| 6,414,107 | B1 | 7/2002 | Zobel et al. |
| 7,183,342 | B2 * | 2/2007 | Miyamoto et al. ............ 524/161 |
| 7,943,686 | B2 | 5/2011 | Seidel et al. |
| 2006/0287422 | A1 | 12/2006 | Volkers et al. |
| 2007/0135544 | A1 | 6/2007 | Seidel et al. |
| 2008/0258338 | A1 | 10/2008 | Seidel et al. |
| 2009/0030128 | A1 * | 1/2009 | Chakravarti et al. .......... 524/413 |
| 2009/0239991 | A1 | 9/2009 | Avtomonov et al. |
| 2010/0144938 | A1 | 6/2010 | Seidel et al. |

FOREIGN PATENT DOCUMENTS

| DE | 199 51 879 A1 | 5/2000 |
| EP | 0576950 A2 | 1/1994 |
| EP | 0 899 302 A1 | 3/1999 |
| WO | 0034371 A1 | 6/2000 |
| WO | 2007065579 A1 | 6/2007 |
| WO | 2008/122359 A1 | 10/2008 |
| WO | 2009118114 A1 | 10/2009 |
| WO | 2010063381 A1 | 6/2010 |

OTHER PUBLICATIONS

International Search Report of PCT/EP2012/070983 Dated Jan. 18, 2013.

* cited by examiner

Primary Examiner — Randy Gulakowski
Assistant Examiner — Christopher M Rodd
(74) Attorney, Agent, or Firm — Miles & Stockbridge P.C.

(57) ABSTRACT

The present invention relates to polycarbonate compositions having improved processing stability, increased heat stability and a good natural color, and to their preparation and use, wherein the polycarbonate compositions contain an adsorber or absorber and an acid.

The present invention relates further to a compounding process for the preparation of heat stabilized polycarbonate compositions containing constituents having a basic action, using acids applied to an adsorber or absorber.

The present invention relates further to the use of Brönsted acids applied to an adsorber or absorber for the heat stabilization of polymer mixtures, containing basic impurities, containing at least one polymer prepared by polycondensation, during compounding and thermal shaping.

16 Claims, No Drawings

STABILISED POLYCARBONATE COMPOSITIONS WITH BLENDS OF SILICA AND AN INORGANIC ACID

CROSS REFERENCE TO RELATED APPLICATIONS

This application claims priority to European Patent Application No. 11186664.6, filed Oct. 26, 2011, the content of which is incorporated herein by reference in its entirety.

BACKGROUND

1. Field of the Invention

The present invention relates to polycarbonate compositions and to their preparation and use, wherein the polycarbonate compositions contain an adsorber or absorber and an acid.

2. Description of Related Art

The present invention relates further to a compounding process for the preparation of stabilised polycarbonate compositions containing constituents having a basic action, using acids applied to an adsorber or absorber. The application of the acid to the adsorber or absorber is carried out, for example and preferably, by blending the adsorber or absorber with an acid that wets the adsorber or absorber or alternatively with a solution of an acid that wets the adsorber or absorber. In a preferred embodiment, these blends are pulverulent and pourable.

The compositions according to the invention, or prepared by the compounding process according to the invention, have improved processing stability, in particular improved stability of the gloss level with variation of the processing temperature, as well as increased heat stability and a good natural colour.

In the processing of polymers, compounding refers to the preparation of a finished plastics moulding composition, the compound, from optionally a plurality of polymeric raw materials with the optional addition of polymer additives such as, for example, fillers and reinforcing materials, adhesion promoters, lubricants, stabilisers, etc. Compounding takes place, for example, in kneaders or extruders and comprises the process operations of feeding, melting, dispersing, mixing, degassing and pressure build-up. Compounding is generally followed by solidification of the compound, which is effected by cooling, and granulation thereof.

Impact modifiers, which are used in the preparation/compounding of polycarbonate compositions, often contain basic impurities as a result of their preparation. They contain, for example, residual amounts of substances having a basic action, which are used as polymerisation aids, for example as emulsifiers in emulsion polymerisation, or as auxiliary substances in the working-up processes. In some cases, additives having a basic action (e.g. lubricants and demoulding agents) are also added purposively to ABS polymers. Likewise, many commercially available fillers, such as, for example, talc or other commercially available polymer additives such as, for example, some antistatics (for example polyether amides), lubricants (for example ethylene bis stearamide), stabilisers (for example benzotriazoles used as light stabilisers), pigments (for example titanium dioxide), nitrogen-containing organic colourings (for example azo compounds or pyrazolones) and nitrogen-containing flame retardants (for example phosphonate amines), exhibit alkaline behaviour or contain basic impurities.

Such additives or impurities having an alkaline action can cause catalytic decomposition of the polycarbonate at high temperatures such as typically occur in the preparation and processing of polycarbonate moulding compositions. Such polycarbonate degradation often manifests itself in a deterioration of the properties of the moulding compositions, in particular of the mechanical parameters such as ductility and tensile elongation properties, but also by molecular weight degradation and surface changes. As a result, the choice of possible substances for use for such polycarbonate compositions is very greatly limited.

While it is known from the prior art to add acidic compounds such as, for example, citric acid to polycarbonate compositions in order to neutralise the harmful effect of additives or impurities having an alkaline action, the addition of such acids frequently leads to disadvantageous properties in the polycarbonate compositions, such as, for example, streaking on the surface, pronounced molecular weight degradation and/or impairment of the natural colour.

EP-A 576 950 A1 and WO-A 2007/065579 describe compositions containing polycarbonate and acrylonitrile-butadiene-styrene (ABS) polymers, which compositions contain basic impurities and are stabilised with multifunctional organic carboxylic acids. Such compositions have good heat stability with regard to the integrity of the molecular weight of the polycarbonate component at high processing temperatures, but they tend to form surface defects (streaks) on the mouldings produced therefrom in injection moulding.

US2006/0287422 describes thermoplastic compositions containing polycarbonate, an impact modifier, optionally a vinyl copolymer, a mineral filler and an acid or an acidic salt, having improved mechanical properties and a reduced tendency to thermal degradation. The application discloses as preferred acids also phosphorus-based compounds of the general formula $H_mPtO_n$, specifically inter alia also phosphoric acid. The application discloses that the compositions according to the invention can be prepared by processes described in the prior art.

In WO-A 2010/063381 there are described impact-modified polycarbonate compositions having an improved combination of hydrolytic and processing stability, which compositions contain polycarbonate, an emulsion graft polymer containing basic impurities, and an acidic phosphorus compound having at least one P—OH functionality. As acidic phosphorus compounds there are described both specific cyclic organophosphite compounds and inorganic or organic phosphorus compounds such as, for example, phosphoric acid or phosphoric acid esters.

EP 2 257 590 A1 discloses polycarbonate compositions having an improved combination of natural colour, hydrolytic stability and processing stability, containing polycarbonate, rubber-modified graft polymer containing residues of a fatty acid salt emulsifier resulting from its preparation, wherein the graft polymer in aqueous dispersion has a pH value greater than 7, and an acidic additive. In this application, hydroxy-functionalised mono- and poly-carboxylic acids as well as phosphoric acid are disclosed as the acidic additive.

EP 1 141 107 A1 discloses polycarbonate compositions having improved heat distortion resistance, elongation at break and stress cracking resistance, containing polycarbonate, graft polymer, optionally vinyl copolymer and from 0.1 to 30 parts by weight of a silicon compound such as, for example, silicon dioxide having a mean particle diameter of from 3 to 50 nm. This application is silent regarding the use of acids in the compositions.

However, none of the mentioned passages describes the compositions of the present invention or the process for their preparation.

SUMMARY

Accordingly, it was an object of the present invention to provide polycarbonate compositions and a process for their preparation, which do not have the above-mentioned disadvantages and accordingly exhibit in particular improved processing stability, measured by the stability of the gloss level with variation of the processing temperature, increased heat stability and a good natural colour.

Surprisingly, it has been found that the desired property profile is exhibited by polymer compositions comprising:

A from 10 to 100 parts by weight, preferably from 30 to 95 parts by weight, more preferably from 40 to 80 parts by weight, particularly preferably from 55 to 65 parts by weight, in each case based on the sum of components A+B, of at least one polymer selected from the group of the aromatic polycarbonates, aromatic polyester carbonates and aromatic polyesters, B from 0 to 90 parts by weight, preferably from 5 to 70 parts by weight, more preferably from 20 to 60 parts by weight, particularly preferably from 35 to 45 parts by weight, in each case based on the sum of components A+B, of at least one optionally rubber-modified vinyl (co)polymer, C from 0.00025 to 0.080 part by weight, preferably from 0.001 to 0.050 part by weight, particularly preferably from 0.001 to 0.010 part by weight, in each case based on the sum of components A+B, of at least one inorganic or organic adsorber, or absorber, D from 0.001 to 0.300 part by weight, preferably from 0.005 to 0.200 part by weight, particularly preferably from 0.005 to 0.05 part by weight, in each case based on the sum of components A+B, of at least one Brönsted-acidic compound, E from 0.1 to 40.0 parts by weight, preferably from 0.2 to 10.0 parts by weight, particularly preferably from 0.3 to 2.0 parts by weight, in each case based on the sum of components A+B, of at least one additive other than components C, D and F, F from 0 to 50 parts by weight, preferably from 3 to 40 parts by weight, particularly preferably from 8 to 30 parts by weight, in each case based on the sum of components A+B, of talc, wherein the sum of the parts by weight of components A+B in the composition is 100.

Preferably, component D, based on the sum of components C and D, is used in an amount of at least 25 parts by weight, more preferably of at least 50 parts by weight, in particular of at least 60 parts by weight.

DETAILED DESCRIPTION OF A PREFERRED EMBODIMENT

In the preparation of the compositions according to the invention, the Brönsted-acidic compound according to component D is in a preferred embodiment applied to the adsorber or absorber according to component C. This is generally effected by physically blending components C and D, wherein it is necessary for the adsorber or absorber according to component C to be wetted by the Brönsted-acidic compound according to component D. In order to achieve wettability, the Brönsted-acidic compound according to component D can optionally be dissolved in a suitable inorganic or organic solvent or blended with an inorganic or organic liquid. Water is used as the preferred solvent.

If, in order to achieve better wetting of component C, component D is applied in the form of a solution to component C, the above-mentioned amounts of component D are based on the pure acid without the solvent.

In a preferred embodiment, the blends of the Brönsted-acidic compound according to component D, or of the solution of the Brönsted-acidic compound according to component D, with the adsorber or absorber according to component C are pulverulent and pourable.

Within the scope of the invention, "powder" or "pulverulent" is understood as meaning a component or a mixture of a plurality of components which is present in the solid state of aggregation and in which the particles have particle sizes of less than 2 mm, preferably of less than 1 mm, in particular of less than 0.5 mm.

Component A

Aromatic polycarbonates and polyester carbonates according to component A that are suitable according to the invention are known in the literature or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 077 934).

The preparation of aromatic polycarbonates and polyester carbonates is carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is also possible.

Diphenols for the preparation of the aromatic polycarbonates and/or aromatic polyester carbonates are preferably those of formula (I)

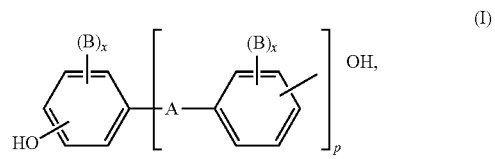

(I)

wherein

A is a single bond, C1- to C5-alkylene, C2- to C5-alkylidene, C5- to C6-cycloalkylidene, —O—, —SO—, —CO—, —S—, —SO2-, C6- to C12-arylene, to which further aromatic rings optionally containing heteroatoms can be fused, or a radical of formula (II) or (III)

(II)

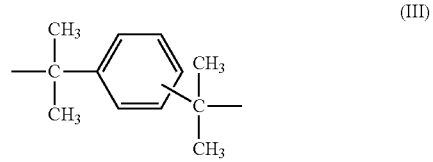

(III)

B is in each case C1- to C12-alkyl, preferably methyl, halogen, preferably chlorine and/or bromine, x each independently of the other is 0, 1 or 2, p is 1 or 0, and R5 and R6 can be chosen individually for each X1 and each independently of the other is hydrogen or C1- to C6-alkyl, preferably hydrogen, methyl or ethyl, X1 is carbon and m is an integer from 4 to 7, preferably 4 or 5, with the proviso that on at least one atom X1, R5 and R6 are simultaneously alkyl.

Preferred diphenols are hydroquinone, resorcinol, dihydroxydiphenols, bis-(hydroxyphenyl)-C1-C5-alkanes, bis-(hydroxyphenyl)-C5-C6-cycloalkanes, bis-(hydroxyphenyl) ethers, bis-(hydroxyphenyl)sulfoxides, bis-(hydroxyphenyl) ketones, bis-(hydroxyphenyl)-sulfones and α,α-bis-(hydroxyphenyl)-diisopropyl-benzenes, and derivatives thereof brominated and/or chlorinated on the ring.

Particularly preferred diphenols are 4,4'-dihydroxydiphenyl, bisphenol A, 2,4-bis(4-hydroxy-phenyl)-2-methylbutane, 1,1-bis-(4-hydroxyphenyl)-cyclohexane, 1,1-bis-(4-hydroxy-phenyl)-3,3,5-trimethylcyclohexane, 4,4'-dihydroxydiphenyl sulfide, 4,4'-dihydroxydiphenylsulfone and di- and tetra-brominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be used on their own or in the form of arbitrary mixtures. The diphenols are known in the literature or are obtainable according to processes known in the literature.

Chain terminators suitable for the preparation of thermoplastic aromatic polycarbonates are, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates can be branched in a known manner, preferably by the incorporation of from 0.05 to 2.0 mol %, based on the sum of the diphenols used, of compounds having a functionality of three or more than three, for example those having three or more phenolic groups.

Both homopolycarbonates and copolycarbonates are suitable. For the preparation of copolycarbonates of component A according to the invention it is also possible to use from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared according to processes known in the literature. The preparation of copolycarbonates containing polydiorganosiloxanes is described in DE-A 3 334 782.

Preferred polycarbonates in addition to the bisphenol A homopolycarbonates are the copolycarbonates of bisphenol A with up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of from 1:20 to 20:1 are particularly preferred.

In the preparation of polyester carbonates, a carbonic acid halide, preferably phosgene, is additionally used concomitantly as bifunctional acid derivative.

Suitable chain terminators for the preparation of the aromatic polyester carbonates, in addition to the monophenols already mentioned, are also the chlorocarbonic acid esters thereof and the acid chlorides of aromatic monocarboxylic acids, which can optionally be substituted by C1- to C22-alkyl groups or by halogen atoms, as well as aliphatic C2- to C22-monocarboxylic acid chlorides.

The amount of chain terminators is in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also contain hydroxycarboxylic acids incorporated therein.

The aromatic polyester carbonates can be both linear and branched in known manner (see in this connection DE-A 2 940 024 and DE-A 3 007 934).

There can be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be placed in a reaction vessel with the diphenols; acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or distributed randomly.

The relative solution viscosity ($\eta$rel) of the aromatic polycarbonates and polyester carbonates is preferably in the range of from 1.18 to 1.4, particularly preferably in the range of from 1.20 to 1.32 (measured on solutions of 0.5 g of polycarbonate or polyester carbonate in 100 ml of methylene chloride solution at 25° C.). The weight-average molecular weight Mw of the aromatic polycarbonates and polyester carbonates is preferably in the range of from 15,000 to 35,000, more preferably in the range of from 20,000 to 33,000, particularly preferably from 23,000 to 30,000, determined by GPC (gel permeation chromatography in methylene chloride with polycarbonate as standard).

In a preferred embodiment, the aromatic polyesters that are suitable according to the invention as component A are polyalkylene terephthalates. In a particularly preferred embodiment, they are reaction products of aromatic dicarboxylic acids or reactive derivatives thereof, such as dimethyl esters or anhydrides, and aliphatic, cycloaliphatic or araliphatic diols, and mixtures of those reaction products.

Particularly preferred polyalkylene terephthalates contain at least 80 wt. %, preferably at least 90 wt. %, based on the dicarboxylic acid component, of terephthalic acid radicals and at least 80 wt. %, preferably at least 90 mol %, based on the diol component, of ethylene glycol and/or 1,4-butanediol radicals.

As well as containing terephthalic acid radicals, the preferred polyalkylene terephthalates can contain up to 20 mol %, preferably up to 10 mol %, of radicals of other aromatic or cycloaliphatic dicarboxylic acids having from 8 to 14 carbon atoms or of aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

As well as containing ethylene glycol and/or 1,4-butanediol radicals, the preferred polyalkylene terephthalates can contain up to 20 mol %, preferably up to 10 mol %, of other aliphatic diols having from 3 to 12 carbon atoms or of cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxyphenyl)-propane (DE-A 2 407 674, 2 407 776, 2 715 932).

The polyalkylene terephthalates can be branched by the incorporation of relatively small amounts of tri- or tetrahydric alcohols or tri- or tetra-basic carboxylic acids, for example according to DE-A 1 900 270 and U.S. Pat. No. 3,692,744. Examples of preferred branching agents are trimesic acid, trimellitic acid, trimethylol-ethane and -propane and pentaerythritol.

Particular preference is given to polyalkylene terephthalates that have been prepared solely from terephthalic acid and reactive derivatives thereof (e.g. dialkyl esters thereof) and ethylene glycol and/or 1,4-butanediol, and to mixtures of such polyalkylene terephthalates.

Mixtures of polyalkylene terephthalates contain from 1 to 50 wt. %, preferably from 1 to 30 wt. %, polyethylene terephthalate and from 50 to 99 wt. %, preferably from 70 to 99 wt. %, polybutylene terephthalate.

The polyalkylene terephthalates that are preferably used generally have a limiting viscosity of from 0.4 to 1.5 dl/g, preferably from 0.5 to 1.2 dl/g, measured in phenol/o-dichlorobenzene (1:1 parts by weight) at 25° C. in an Ubbelohde viscometer.

The polyalkylene terephthalates can be prepared by methods known per se (see e.g. Kunststoff-Handbuch, Volume VIII, p. 695 ff, Carl-Hanser-Verlag, Munich 1973).

Component B

Component B is rubber-modified graft polymers B.1 or rubber-free vinyl (co)polymers B.2 or a mixture of a plurality of such polymers.

Rubber-modified graft polymers B.1 used as component B comprise

B.1.1 from 5 to 95 wt. %, preferably from 15 to 92 wt. %, in particular from 25 to 60 wt. %, based on component B.1, of at least one vinyl monomer on B.1.2 from 95 to 5 wt. %, preferably from 85 to 8 wt. %, in particular from 75 to 40 wt. %, based on component B.1, of one or more rubber-like graft bases, preferably having glass transition temperatures <10° C., more preferably <0° C., particularly preferably <−20° C.

The glass transition temperature is determined by means of differential scanning calorimetry (DSC) according to standard DIN EN 61006 at a heating rate of 10 K/min. with definition of the Tg as the mid-point temperature (tangent method).

The graft base B.1.2 generally has a mean particle size (d50 value) of from 0.05 to 10 μm, preferably from 0.1 to 5 μm, particularly preferably from 0.2 to 1 μm.

The mean particle size d50 is the diameter above and below which in each case 50 wt. % of the particles lie. It can be determined by ultracentrifuge measurement (W. Scholtan, H. Lange, Kolloid, Z. and Z. Polymere 250 (1972), 782-1796).

Monomers B.1.1 are preferably mixtures of:

B.1.1.1 from 50 to 99 parts by weight, preferably from 60 to 80 parts by weight, in particular from 70 to 80 parts by weight, based on B.1.1, of vinyl aromatic compounds and/or vinyl aromatic compounds substituted on the ring (such as styrene, la-methylstyrene, p-methylstyrene, p-chlorostyrene) and/or methacrylic acid (C1-C8)-alkyl esters, such as methyl methacrylate, ethyl methacrylate, and B.1.1.2 from 1 to 50 parts by weight, preferably from 20 to 40 parts by weight, in particular from 20 to 30 parts by weight, based on B.1.1, of vinyl cyanides (unsaturated nitriles such as acrylonitrile and methacrylonitrile) and/or (meth)acrylic acid (C1-C8)-alkyl esters, such as methyl methacrylate, n-butyl acrylate, tert-butyl acrylate, and/or derivatives (such as anhydrides and imides) of unsaturated carboxylic acids, for example maleic anhydride and N-phenyl-maleimide.

Preferred monomers B.1.1.1 are selected from at least one of the monomers styrene, α-methylstyrene and methyl methacrylate, and preferred monomers B.1.1.2 are selected from at least one of the monomers acrylonitrile, maleic anhydride and methyl methacrylate. Particularly preferred monomers are B.1.1.1 styrene and B.1.1.2 acrylonitrile.

Graft bases B.1.2 suitable for the graft polymers B.1 are, for example, diene rubbers, EP(D)M rubbers, that is to say those based on ethylene/propylene and optionally diene, acrylate, polyurethane, silicone, chloroprene and ethylene/vinyl acetate rubbers, as well as silicone/acrylate composite rubbers.

Preferred graft bases B.1.2 are diene rubbers, for example based on butadiene and isoprene, or mixtures of diene rubbers or copolymers of diene rubbers or mixtures thereof with further copolymerisable monomers (e.g. according to B.1.1.1 and B.1.1.2).

Pure polybutadiene rubber is particularly preferred as the graft base B.1.2.

Particularly preferred polymers B.1 are, for example, ABS or MBS polymers, as are described, for example, in DE-OS 2 035 390 (=U.S. Pat. No. 3,644,574) or in DE-OS 2 248 242

(=GB-PS 1 409 275) or in Ullmanns, Enzyklopädie der Technischen Chemie, Vol. 19 (1980), p. 280 ff.

The graft copolymers B.1 are prepared by radical polymerisation, for example by emulsion, suspension, solution or mass polymerisation, preferably by emulsion or mass polymerisation, in particular by emulsion polymerisation.

The gel content of the graft base B.1.2 is at least 30 wt. %, preferably at least 40 wt. %, in particular at least 60 wt. %, in each case based on B.1.2 and measured as the insoluble portion in toluene.

The gel content of the graft base B.1.2 is determined at 25° C. in a suitable solvent as the portion insoluble in those solvents (M. Hoffmann, H. Krömer, R. Kuhn, Polymeranalytik I and II, Georg Thieme-Verlag, Stuttgart 1977).

Particularly suitable graft bases are also ABS polymers, which are prepared by redox initiation with an initiator system of organic hydroperoxide and ascorbic acid according to U.S. Pat. No. 4,937,285.

Because, as is known, the graft monomers are not necessarily grafted completely onto the graft base in the graft reaction, graft polymers B.1 are also understood according to the invention as being products that are obtained by (co)polymerisation of the graft monomers in the presence of the graft base and are obtained concomitantly on working up. Such products can accordingly also contain free (co)polymer of the graft monomers, that is to say (co)polymer that is not chemically bonded to the rubber.

Suitable acrylate rubbers according to B.1.2 are preferably polymers of acrylic acid alkyl esters, optionally with up to 40 wt. %, based on B.1.2, of other polymerisable, ethylenically unsaturated monomers. The preferred polymerisable acrylic acid esters include C1- to C8-alkyl esters, for example methyl, ethyl, butyl, n-octyl and 2-ethylhexyl ester; haloalkyl esters, preferably halo-C1-C8-alkyl esters, such as chloroethyl acrylate, as well as mixtures of those monomers.

For crosslinking, monomers having more than one polymerisable double bond can be copolymerised. Preferred examples of crosslinking monomers are esters of unsaturated monocarboxylic acids having from 3 to 8 carbon atoms and unsaturated monohydric alcohols having from 3 to 12 carbon atoms, or of saturated polyols having from 2 to 4 OH groups and from 2 to 20 carbon atoms, such as ethylene glycol dimethacrylate, allyl methacrylate; polyunsaturated heterocyclic compounds, such as trivinyl and triallyl cyanurate; polyfunctional vinyl compounds, such as di- and tri-vinylbenzenes; but also triallyl phosphate and diallyl phthalate. Preferred crosslinking monomers are allyl methacrylate, ethylene glycol dimethacrylate, diallyl phthalate and heterocyclic compounds which have at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of crosslinking monomers is preferably from 0.02 to 5 wt. %, in particular from 0.05 to 2 wt. %, based on the graft base B.1.2. In the case of cyclic crosslinking monomers having at least three ethylenically unsaturated groups, it is advantageous to limit the amount to less than 1 wt. % of the graft base B.1.2.

Preferred "other" polymerisable, ethylenically unsaturated monomers which can optionally be used, in addition to the acrylic acid esters, in the preparation of the graft base B.1.2 are, for example, acrylonitrile, styrene, (1-methylstyrene, acrylamides, vinyl C1-C6-alkyl ethers, methyl methacrylate, butadiene. Preferred acrylate rubbers as graft base B.1.2 are emulsion polymers having a gel content of at least 60 wt. %.

Further suitable graft bases according to B.1.2 are silicone rubbers having graft-active sites, as are described in DE-OS 3 704 657, DE-OS 3 704 655, DE-OS 3 631 540 and DE-OS 3 631 539.

The rubber-free vinyl (co)polymers according to component B.2 are preferably rubber-free homo- and/or co-polymers of at least one monomer from the group of the vinyl aromatic compounds, vinyl cyanides (unsaturated nitriles), (meth)acrylic acid (C1 to C8)-alkyl esters, unsaturated carboxylic acids and derivatives (such as anhydrides and imides) of unsaturated carboxylic acids.

Particularly suitable are (co)polymers B.2 of:

B.2.1 from 50 to 99 wt. %, preferably from 60 to 80 wt. %, in particular from 70 to 80 wt. %, in each case based on the total weight of the (co)polymer B.2, of at least one monomer selected from the group of the vinyl aromatic compounds, such as, for example, styrene, α-methylstyrene, vinyl aromatic compounds substituted on the ring, such as, for example, p-methylstyrene, p-chlorostyrene, and (meth)acrylic acid (C1-C8)-alkyl esters, such as, for example, methyl methacrylate, n-butyl acrylate, tert-butyl acrylate, and B.2.2 from 1 to 50 wt. %, preferably from 20 to 40 wt. %, in particular from 20 to 30 wt. %, in each case based on the total weight of the (co)polymer B.2, of at least one monomer selected from the group of the vinyl cyanides, such as, for example, unsaturated nitriles such as, for example, acrylonitrile and methacrylonitrile, (meth)acrylic acid (C1-C8)-alkyl esters, such as, for example, methyl methacrylate, n-butyl acrylate, tert-butyl acrylate, unsaturated carboxylic acids and derivatives of unsaturated carboxylic acids, such as, for example, maleic anhydride and N-phenyl-maleimide.

Those (co)polymers B.2 are resin-like, thermoplastic and rubber-free. The copolymer of B.2.1 styrene and B.2.2 acrylonitrile is particularly preferred.

Such (co)polymers B.2 are known and can be prepared by radical polymerisation, in particular by emulsion, suspension, solution or mass polymerisation. The (co)polymers preferably have mean molecular weights Mw (weight average, determined by GPC with polystyrene as standard) of from 15,000 to 250,000 g/mol, preferably in the range of from 80,000 to 150,000 g/mol.

Component C

As component C there is used at least one adsorptive or absorptive inorganic or organic material.

In a preferred embodiment, component C is finely divided and/or porous materials having a large outer and/or inner surface area.

Such materials are preferably thermally inert inorganic materials such as, for example, oxides or mixed oxides, silicates, sulfides, nitrides of metals or transition metals.

In a preferred embodiment, component C is finely divided and/or microporous silicas or silicon dioxides or silicates of natural or synthetic origin.

As finely divided silicon dioxide of natural origin there is suitable as component C according to the invention, for example, kieselguhr. That is a whitish, pulverulent substance which consists mainly of the silicon dioxide shells of fossil diatoms. The shells consist for the most part of amorphous (non-crystalline) silicon dioxide ($SiO_2$) and have a highly porous structure.

In a preferred embodiment there are used as component C of synthetic origin precipitated silicas and silicates as well as pyrogenic silicas.

Synthetically produced precipitated silicas (silica gels) and silicates are finely divided, loose, white powders, which are also obtainable in granulate form for specific applications.

Their particles are amorphous. Chemically, such silicas and silicates consist of up to about 99 percent silicon dioxide ($SiO_2$).

The starting material for the production of silica by the wet route is alkali silicate solutions, preferably sodium water glass, from which amorphous silica is precipitated by addition of acid. After filtering, washing and drying, the precipitated product consists of from 86 to 88% $SiO_2$ and from 10 to 12% water, which is bonded physically both in the molecular unit and to the surface.

Metal silicates such as calcium silicate and aluminium silicate are obtained by replacing all or part of the acid used in the precipitation by metal salts, which form sparingly soluble precipitates with water glass.

The precipitated silica suspension is transferred to filter presses, in which the salts formed in the precipitation are washed out and as much water as possible is removed. The filter cake still contains considerable amounts of water, which are evaporated off in the subsequent drying. Drying takes place by different methods according to which properties are desired for the silica product. Grinding, screening and/or granulation steps frequently follow.

An alternative process for the preparation of finely divided silicon dioxides that are suitable as component C is the flame hydrolysis of silicon tetrachloride ($SiCl_4$) or other volatile chlorosilanes in an oxyhydrogen flame ("Aerosil process"). In this process, the so-called pyrogenic silicas are formed with primary particle diameters of generally approximately from 5 to 50 nm and with specific surface areas of generally approximately from 30 to 600 m2/g. By varying the concentration of the reactants, the flame temperature and the residence time of the silica in the combustion chamber, the particle sizes, the particle size distribution, the specific surface areas and the surface quality of the pyrogenic silicas can be influenced.

The primary particles melt in the flame to form larger units (aggregates) of from 100 to 1000 nm in diameter which, upon cooling, in turn form flocculent, mesoporous tertiary structures (agglomerates) having a diameter of approximately from 1 to 250 µm.

In a particularly preferred embodiment, precipitated silicas are used as component C. These can have a hydrophilic surface or can be in hydrophobised form after surface modification with organic molecules.

Because component D in a particularly preferred embodiment is of hydrophilic nature and is preferably used in the form of an aqueous solution, it is recommended in this special case to use a hydrophilic precipitated silica as component C.

However, it can also be advantageous in special cases, in order to achieve optimum wetting of component C by component D, to use a precipitated silica with a hydrophobised surface.

The precipitated silicas used as component C in the preferred embodiment preferably have a specific BET surface area, determined by nitrogen adsorption according to ISO 5794-1, of from 150 to 600 m2/g, in particular from 300 to 600 m2/g. In addition, they have an oil absorption number, measured by absorption of dibutyl phthalate (DBP) according to DIN 53601, of preferably from 150 to 500 g/100 g, in particular from 300 to 400 g/100 g. The hydrophilic precipitated silicas that are preferably used further preferably have a pH value, measured according to ISO 787-9 on a 5 wt. % suspension of the silica in water, in the acidic range (i.e. <7), in particular in the range of from 6 to 7.

Component D

As component D there is used at least one Brönsted-acidic compound of any kind.

In a preferred embodiment, component D is applied to the carrier C in a solution in an inorganic or organic solvent, preferably water.

The Brönsted-acidic compound is used in the solution preferably in a concentration of from 0.2 to 90 wt. %, preferably from 1 to 90 wt. %, particularly preferably from 10 to 90 wt. %, in particular from 50 to 90 wt. %, in each case based on the solution, that is to say based on the sum of component D and the solvent.

In the case of acids that are used in solution, the amount of component D is calculated as pure acid without solvent.

The Brönsted-acidic compound is preferably an inorganic acid, more preferably a phosphoric acid compound, that is to say a compound having at least one POH functionality.

Examples of such compounds are ortho-phosphoric acid $P(O)(OH)_3$, phosphorous acid $HP(O)(OH)_2$, hypophosphorous acid $H_2P(O)(OH)$, organophosphorus compounds of phosphorous and hypophosphorous acid having the general formula $RP(O)(OH)_2$, $R(H)P(O)(OH)$ and $R(R')P(O)(OH)$, wherein R and R' independently of one another represent any desired optionally substituted alkyl, aryl or alkylaryl radical, as well as cyclic or linear oligomeric or polymeric compounds, acid salts as well as acid partial esters of the above-mentioned compounds. R and R' are particularly preferably selected independently of one another from the group comprising methyl, ethyl, propyl, isopropyl, butyl, isobutyl and tert-butyl radicals.

In a preferred embodiment it is a Brönsted-acidic phosphorus compound in which the phosphorus has oxidation state +3 or +5. Oxidation state +5 is particularly preferred.

Suitable as particularly preferred Brönsted-acidic phosphorus compounds are, for example, ortho-phosphoric acid, meta-phosphoric acid, oligo- and poly-phosphoric acids, phosphorous acid, methylphosphonic acid $CH_3P(O)(OH)_2$, acid salts of the above-mentioned compounds with monovalent and/or divalent metal cations, such as, for example, $NaH_2PO_4$, $Na_2HPO_4$, $KH_2PO_4$, $K_2HPO_4$, $Mg0.5H_2PO_4$, $MgHPO_4$, $Ca0.5H_2PO_4$, $CaHPO_4$, $Zn0.5H_2PO_4$, $ZnHPO_4$, $NaH_2PO_3$, $KH_2PO_3$, $Mg0.5H_2PO_3$, $Ca0.5H_2PO_3$, $Zn0.5H_2PO_3$, as well as partial esters of the above-mentioned compounds, such as, for example, $P(O)(OH)(OR)(OR')$, $P(O)(OH)_2(OR)$, $HP(O)(OH)(OR)$ and $CH_3P(O)(OH)(OR)$, wherein R, R' are as defined above.

In a preferred embodiment, the Brönsted-acidic phosphorus compound is ortho-phosphoric acid or phosphorous acid, and in a particularly preferred embodiment it is ortho-phosphoric acid, which is preferably used in the form of concentrated phosphoric acid.

Component E

The composition can contain as component E commercially available polymer additives.

There are suitable as commercially available polymer additives according to component E additives other than components C and D, such as, for example, flame retardants (for example phosphorus or halogen compounds), flame-retardant synergists, smoke-inhibiting additives (for example boric acid or borates), antidripping agents (for example compounds of the substance classes of the fluorinated polyolefins, of the silicones as well as aramid fibres), internal and external lubricants and demoulding agents (for example pentaerythritol tetrastearate, Montan wax or polyethylene wax), flowability aids (for example low molecular weight vinyl (co)polymers), antistatics (for example block copolymers of ethylene oxide and propylene oxide, other polyethers or polyhydroxy ethers, polyether amides, polyester amides or sulfonic acid salts), conductivity additives (for example conductive black or carbon nanotubes), stabilisers (for example UV/light stabilisers, heat stabilisers, antioxidants, transesterification inhibitors, hydrolytic stabilisers), additives having antibacterial action (for example silver or silver salts), additives improving scratch resistance (for example silicone oils or hard fillers such as (hollow) ceramics spheres), IR absorbents, optical brighteners, fluorescent additives, fillers and reinforcing materials other than component F (e.g. ground glass or carbon fibres, (hollow) glass or ceramics spheres, mica, kaolin, CaCO3 and glass flakes) as well as colourings and pigments (for example carbon black, titanium dioxide or iron oxide) or mixtures of a plurality of the mentioned additives.

As flame retardants according to component E there are preferably used phosphorus-containing compounds. Such compounds are preferably selected from the groups of the monomeric and oligomeric phosphoric and phosphonic acid esters, phosphonate amines and phosphazenes, it also being possible to use as flame retardants mixtures of a plurality of components selected from one or various of those groups. Other halogen-free phosphorus compounds not mentioned specifically here can also be used on their own or in any desired combination with other halogen-free phosphorus compounds.

Preferred monomeric and oligomeric phosphoric and phosphonic acid esters are phosphorus compounds of the general formula (IV)

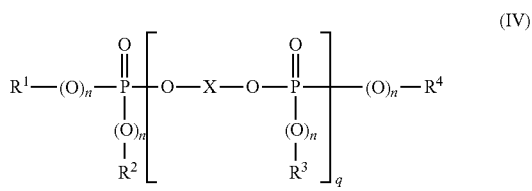
(IV)

wherein

R1, R2, R3 and R4 independently of one another represent in each case optionally halogenated C1- to C8-alkyl, or C5- to C6-cycloalkyl, C6- to C20-aryl or C7- to C12-aralkyl each optionally substituted by alkyl, preferably C1- to C4-alkyl, and/or by halogen, preferably chlorine or bromine, each of the substituents n independently of the others represents 0 or 1, q represents from 0 to 30 and X represents a mono- or poly-nuclear aromatic radical having from 6 to 30 carbon atoms, or a linear or branched aliphatic radical having from 2 to 30 carbon atoms which can be OH-substituted and can contain up to 8 ether bonds.

R1, R2, R3 and R4 independently of one another preferably represent C1- to C4-alkyl, phenyl, naphthyl or phenyl-C1-C4-alkyl. The aromatic groups R1, R2, R3 and R4 can in turn be substituted by halogen and/or alkyl groups, preferably chlorine, bromine and/or C1- to C4-alkyl. Particularly preferred aryl radicals are cresyl, phenyl, xylenyl, propylphenyl or butylphenyl as well as the corresponding brominated and chlorinated derivatives thereof.

X in formula (IV) preferably represents a mono- or polynuclear aromatic radical having from 6 to 30 carbon atoms. It is preferably derived from diphenols of formula (I).

Each of the substituents n in formula (IV), independently of the others, can be 0 or 1; n is preferably 1.

q represents values from 0 to 30, preferably from 0.3 to 20, particularly preferably from 0.5 to 10, in particular from 0.5 to 6, most particularly preferably from 1.1 to 1.6.

X particularly preferably represents

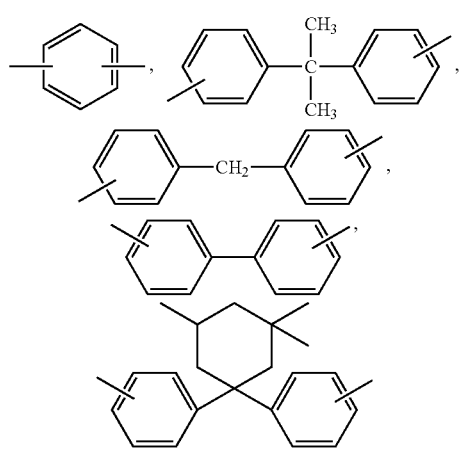

or chlorinated or brominated derivatives thereof; in particular X is derived from resorcinol, hydroquinone, bisphenol A or diphenylphenol. X is particularly preferably derived from bisphenol A.

It is also possible to use as component F according to the invention mixtures of different phosphates.

Phosphorus compounds of formula (IV) are in particular tributyl phosphate, triphenyl phosphate, tricresyl phosphate, diphenylcresyl phosphate, diphenyloctyl phosphate, diphenyl-2-ethylcresyl phosphate, tri-(isopropylphenyl)phosphate, resorcinol-bridged oligophosphate and bisphenol A-bridged oligophosphate. The use of oligomeric phosphoric acid esters of formula (IV) that are derived from bisphenol A is particularly preferred.

Most preferred as component F is bisphenol A-based oligophosphate according to formula (IVa)

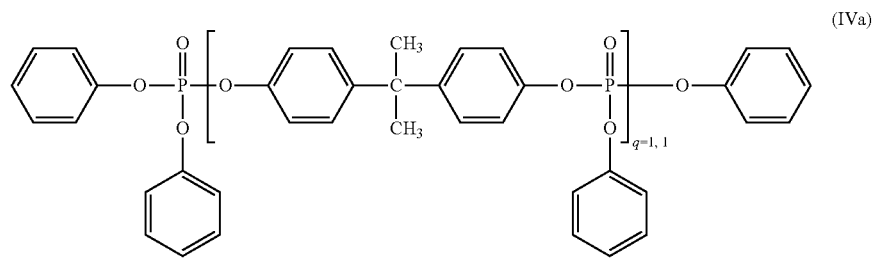
(IVa)

The phosphorus compounds according to component F are known (see e.g. EP-A 0 363 608, EP-A 0 640 655) or can be prepared according to known methods in an analogous manner (e.g. Ullmanns Enzyklopädie der technischen Chemie, Vol. 18, p. 301 ff 1979; Houben-Weyl, Methoden der organischen Chemie, Vol. 12/1, p. 43; Beilstein Vol. 6, p. 177).

When mixtures of different phosphorus compounds are used, and in the case of oligomeric phosphorus compounds, the indicated q value is the mean q value. The mean q value can be determined by determining the composition of the phosphorus compound (molecular weight distribution) by means of a suitable method (gas chromatography (GC), high pressure liquid chromatography (HPLC), gel permeation chromatography (GPC)) and calculating the mean values for q therefrom.

It is also possible to use phosphonate amines and phosphazenes, as are described in WO 00/00541 and WO 01/18105, as flame retardants.

The flame retardants can be used on their own or in an arbitrary mixture with one another or in admixture with other flame retardants.

In a preferred embodiment, the flame retardants are used in combination with polytetrafluoroethylene (PTFE) as antidripping agent.

Component F

As component F there is optionally used naturally occurring or synthetically produced talc as filler.

Pure talc has the chemical composition 3 MgO.4 SiO2.H2O and accordingly has an MgO content of 31.9 wt. %, an SiO2 content of 63.4 wt. % and a content of chemically bonded water of 4.8 wt. %. It is a silicate having a layer structure.

Naturally occurring talc materials generally do not have the ideal composition given above because they are contaminated by the partial replacement of magnesium by other elements, by the partial replacement of silicon, for example by aluminium, and/or by intergrowths with other minerals such as, for example, dolomite, magnesite and chlorite.

There are preferably used as component F talc types with particularly high purity. Such talc types are characterised by an MgO content of from 28 to 35 wt. %, preferably from 30 to 33 wt. %, particularly preferably from 30.5 to 32 wt. %, and an SiO2 content of from 55 to 65 wt. %, preferably from 58 to 64 wt. %, particularly preferably from 60 to 62.5 wt. %. Particularly preferred talc types are further distinguished by an Al2O3 content of less than 5 wt. %, particularly preferably less than 1 wt. %, in particular less than 0.7 wt. %.

It is advantageous in particular to use the talc in the form of finely ground types having a mean particle diameter d50 of <10 μm, preferably <5 μm, particularly preferably <2 μm, most particularly preferably <1.5 μm.

The talc can be surface treated, for example silanised, in order to ensure better compatibility with the polymer.

With regard to the processing and preparation of the moulding compositions, the use of compacted talc is advantageous.

The present invention relates further to a process for the preparation of the polycarbonate compositions according to the invention, characterised in that 1. in a first process step, component C is mixed with component D, which wets component C, and component D is thus applied to component C,
2. in a second, subsequent process step, the mixture of components C and D in powder form is compounded with the further components of the composition in a compounding unit, preferably a counter-rotating twin-screw extruder, preferably under the conventional, known conditions for the preparation of polycarbonate blends.

In another preferred embodiment, the pulverulent components B, E and optionally F, or portions thereof, are first premixed mechanically in an intermediate step with the previously prepared pulverulent blend of components C and D, and the pulverulent, pourable mixtures so prepared are fed to the compounding unit with the further components.

In a preferred embodiment, a solution of component D in an organic or inorganic solvent, preferably in water, is first prepared, and that solution is mixed in step 1 with component C.

In a further preferred embodiment, the solvent which was added to the composition by the solution of the acidic compound according to component D is removed again in a degassing zone of the compounding unit by application of a low pressure.

The present invention relates further to the use of Brönsted acids according to component D applied to component C for the heat stabilisation of polymer mixtures, containing basic impurities, containing at least one polymer prepared by polycondensation, during compounding and thermal shaping.

Component A

Linear polycarbonate based on bisphenol A having a weight-average molecular weight Mw of 28,000 g/mol (determined by gel permeation chromatography (GPC) in methylene chloride as solvent and with polycarbonate as standard).

Component B

ABS blend with an acrylonitrile:butadiene:styrene ratio, based on the blend, of 20:19:61 wt. %, containing an ABS polymer prepared by emulsion polymerisation and worked up in basic medium, an ABS polymer prepared by mass polymerisation, and an SAN polymer.

Component C

Hydrophilic silica powder having a specific BET surface area, measured with nitrogen according to ISO 5794-1, of 475 m2/g, a pH value, measured in 5% aqueous suspension according to ISO 787-9, of 6 and an oil absorption number, measured with dibutyl phthalate (DBP) according to DIN 53601, of 335 g/100 g.

Component D

Concentrated aqueous phosphoric acid having a concentration of H3PO4 of 85 wt. %.

Component E1

Pentaerythritol tetrastearate as lubricant/demoulding agent.

Component E2

Heat stabiliser, Irganox® B900 (mixture of 80% Irgafos® 168 and 20% Irganox® 1076; BASF AG; Ludwigshafen/ Irgafos® 168 (tris(2,4-di-tert-butyl-phenyl)phosphite)/Irganox® 1076 (2,6-di-tert-butyl-4-(octadecanoxycarbonylethyl)-phenol) (Ludwigshafen, Germany).

Component E3

Heat stabiliser, Irganox 1076 (2,6-di-tert-butyl-4-(octadecanoxycarbonylethyl)-phenol), BASF (Ludwigshafen, Germany).

Preparation of the Moulding Compositions

Components C and D were first mixed together, with stirring, to form a pourable powder.

The pulverulent components B, E1 to E3 were first premixed mechanically with the previously prepared pulverulent blend of components C and D. The mixtures so prepared were pulverulent and pourable.

In a further process step, the powder mixtures so prepared were introduced by way of a separate metering hopper, together with components A and B, which were likewise metered by way of separate metering hoppers, into the intake zone of a ZSK25 twin-screw extruder from Coperion GmbH (Stuttgart, Germany).

The resulting mixture was brought to a temperature of 260° C. in the melting and kneading zone of the extruder, melted, and kneaded at that temperature, and the plasticised components were thus dispersed in one another.

The mixture so compounded was degassed in the subsequent degassing zone of the extruder by application of a low pressure of 100 mbar (absolute) to the melt, and the water introduced into the mixture by way of component D was thus removed from the polymer alloy again.

The degassed melt was then discharged from the extruder by way of a die, the resulting melt strand was passed for cooling through a water bath at a temperature of about 30° C., and the solidified polymer strand was subsequently granulated by means of a strand granulator.

Production of the Test Specimens and Testing

The granulates resulting from each compounding were processed on an injection-moulding machine (Arburg) at a melt temperature of 260° C. and 300° C. and a tool temperature of 80° C. to form test specimens measuring 80 mm×10 mm×4 mm and 60 mm×40 mm×2 mm.

The iMVR serves as a measure of the polycarbonate molecular weight degradation to be expected at elevated processing temperatures and, accordingly of the heat stability of the composition, and is determined according to ISO 1133 at a melt temperature of 300° C. with a plunger load of 5 kg after a holding time at that temperature of 300° C. of 15 minutes.

The natural colour/inherent colour is measured in reflection according to DIN 6174 on sheets measuring 60 mm×40 mm×2 mm, which were produced by injection moulding at a melt temperature of 260° C. The yellowness index YI is calculated according to ASTM E313.

The gloss level is determined on sheets measuring 60 mm×40 mm×2 mm, which were produced by injection moulding at a melt temperature of 260° C. and 300° C. Measurement is carried out in reflection at measuring angles of 20° and 60° according to DIN 67530.

The relative change in the gloss levels measured at measuring angles of 20° and 60° with an increase in the melt temperature from 260° C. to 300° C. in the injection moulding is used as a measure of the processing stability and is calculated according to:

Change in gloss level (260° C.→300° C.)=100%·(gloss level at 300° C.−gloss level at 260° C.)/gloss level at 260° C.

The change in gloss level is determined separately for the two measuring angles.

TABLE 1

| Material used | C1 | C2 | 1 | C3 |
|---|---|---|---|---|
| A | 60.35 | 60.35 | 60.35 | 60.35 |
| B | 38.59 | 38.59 | 38.59 | 38.59 |
| E1 | 0.74 | 0.74 | 0.74 | 0.74 |
| E2 | 0.12 | 0.12 | 0.12 | 0.12 |
| E3 | 0.20 | 0.20 | 0.20 | 0.20 |
| D | — | 0.012 | 0.012 | 0.40 |
| C | — | — | 0.003 | 0.10 |
| Testing | | | | |
| iMVR (300° C./15 min) [ml/10 min] | 120 | 59 | 52 | >>200* |
| Yellowness index (260° C.) | 10.7 | 17.1 | 15.5 | 32.1 |
| Gloss level (20°/260° C.) | 95.2 | 94.0 | 94.3 | 79.3 |
| Gloss level (60°/260° C.) | 101.0 | 100.0 | 100.0 | 95.5 |
| Gloss level (20°/300° C.) | 66.4 | 66.5 | 75.7 | 45.8 |

TABLE 1-continued

| Material used | C1 | C2 | 1 | C3 |
|---|---|---|---|---|
| Gloss level (60°/300° C.) | 92.2 | 91.6 | 96.3 | 78.1 |
| Change in gloss level 260° C. → 300° C. (20°) [%] | −30.3 | −29.3 | −19.7 | −42.2 |
| Reduction in gloss level 260° C. → 300° C. (60°) [%] | −8.7 | −8.4 | −3.7 | −18.2 |

It is apparent from the data in Table 1 that the composition according to the invention (Example 1) has improved processing stability as compared with the three comparison examples in terms of the stability of the gloss level to the processing temperature. Compared with Comparison Example 1, which contains neither phosphoric acid compound C nor silica D, the composition of Example 1 according to the invention additionally shows a marked improvement in the heat stability in terms of the degradation of the polycarbonate molecular weight at elevated processing temperatures. Although that defect can largely be eliminated by adding the phosphoric acid compound C on its own (Comparison Example 2), the lack of processing stability in terms of the stability of the gloss level to the processing temperature cannot be eliminated. Furthermore, Comparison Example 2 has a poorer natural colour as compared with the composition according to the invention (Example 1). A comparison of Example 1 according to the invention with Comparison Example C3, in which the blend of phosphoric acid compound C and silica D was used in a higher concentration as compared with Example 1, shows that the desired property combination is only achieved when the total amount of phosphoric acid and silica is limited. At higher concentrations (Comparison Example 3), the positive effect of adding the blend of phosphoric acid compound and silica is reversed, that is to say a deterioration in the heat stability (degradation of the polycarbonate molecular weight), the processing stability (stability of the gloss level to the processing temperature) and the natural colour (yellowness index) is observed.

The invention claimed is:

1. A process for the preparation of a polymer composition comprising:
   A) from 10 to 100 parts by weight, based on a sum of components A+B, of at least one polymer selected from the group consisting of aromatic polycarbonates, aromatic polyester carbonates;
   B) from 0 to 90 parts by weight, based on a sum of components A+B, of at least one optionally rubber-modified vinyl (co)polymer;
   C) from 0.00025 to 0.080 part by weight, based on a sum of components A+B, of at least one inorganic adsorber or inorganic absorber said Component C) comprising a silica compound;
   D) from 0.001 to 0.300 part by weight, based on a sum of components A+B, of at least one Brönsted-acidic compound comprising a phosphoric acid compound;
   E) from 0.1 to 40.0 parts by weight, based on a sum of components A+B, of at least one additive other than components C, D and F;
   F) from 0 to 50 parts by weight, based on a sum of components A+B, of talc; and
   wherein a sum of said parts by weight of components A+B in said composition is 100;

the process comprising:
  mixing component C with component D, such that component D wets component C and forms a mixture; and
  compounding the mixture of components C and D in powder form with further components of said composition in a commercially available compounding unit.

2. The process according to claim 1, comprising first preparing a solution of said component D in an organic or inorganic solvent, and mixing said solution with component C, wherein said solution of component D wets component C.

3. The process according to claim 1, comprising first premixing mechanically components B, E and optionally F, or portions thereof, which are pulverulent, with a previously prepared pulverulent blend of components C and D or optionally of component C and a solution of component D in an organic or inorganic solvent, so as to form a pulverulent, pourable mixture, and feeding said pulverulent pourable mixture to achieve compounding with further components.

4. The process according to comprising in a degassing zone of the compounding unit, removing solvent added to said composition by a solution of the acid compound D by applying low pressure.

5. The process according to claim 1, for the preparation of a polymer composition comprising:
  from 55 to 65 parts by weight of component A;
  from 35 to 45 parts by weight of component B;
  from 0.001 to 0.010 part by weight of component C;
  from 0.005 to 0.05 part by weight of component D;
  from 0.3 to 2.0 parts by weight of component E; and
  from 0 to 50 parts by weight of component F;
  wherein a sum of said parts by weight of components A+B in said composition is 100.

6. A polymer composition comprising:
  A) from 10 to 100 parts by weight, based on a sum of components A+B, of at least one polymer selected from the group consisting of aromatic polycarbonates, aromatic polyester carbonates;
  B) from 0 to 90 parts by weight, based on a sum of components A+B, of at least one optionally rubber-modified vinyl (co)polymer;
  C) from 0.00025 to 0.080 part by weight, based on a sum of components A+B, of at least one inorganic adsorber or inorganic absorber said Component C) comprising a silica compound;
  D) from 0.001 to 0.300 part by weight, based on a sum of components A+B, of at least one Brönsted-acidic compound comprising a phosphoric acid compound;
  E) from 0.1 to 40.0 parts by weight, based on a sum of components A+B, of at least one additive other than components C, D and F; and
  F) from 0 to 50 parts by weight, based on a sum of components A+B, of talc;
  wherein a sum of the parts by weight of components A+B in said composition is 100;
  Wherein said composition contains Component D) applied to Component C) such that Component D) wets Component C) and forms a mixture; and wherein said mixture is mixed with the remaining components of the polymer composition.

7. The polymer composition according to claim 6, comprising:
  from 55 to 65 parts by weight of component A;
  from 35 to 45 parts by weight of component B;
  from 0.001 to 0.010 part by weight of component C;
  from 0.005 to 0.05 part by weight of component D;
  from 0.3 to 2.0 parts by weight of component E; and
  from 0 to 50 parts by weight of component F.

8. The polymer composition according to claim 6, wherein said inorganic adsorber or inorganic absorber of Component C is different from component A or B.

9. The polymer composition according to claim 6, wherein said component D is used in an amount of at least 25 parts by weight based on a sum of components C and D.

10. The polymer composition according to claim 6, wherein said component D is used in an amount of at least 60 parts by weight, based on a sum of components C and D.

11. The polymer composition according to claim 6, wherein said component C is at least one selected from the group consisting of microporous silicas, silicon dioxides and silicates of natural or synthetic origin.

12. The polymer composition according to claim 6, wherein said component C is selected from the group consisting of precipitated silicas having a specific BET surface area, determined by nitrogen adsorption according to ISO 5794-1, of from 150 to 600 $m^2/g$, an oil absorption number, measured by absorption of dibutyl phthalate according to DIN 53601, of from 150 to 500 g/100 g, and a pH value, measured according to ISO 787-9 on a 5 wt. % suspension of the silica in water, of <7.

13. The polymer composition according to claim 6, wherein said component D is selected from the group consisting of Brönsted-acidic phosphorus compounds in which phosphorus has oxidation state +3 or +5.

14. The polymer composition of claim 6 having improved processing stability, measured by stability of the gloss level with variation of the processing temperature, increased heat stability measured by iMVR, and an improved natural colour, measured by yellowness index.

15. The polymer composition of claim 14, wherein said gloss level measured at 60° is reduced by less than 5% when melt temperature in the injection molding process is increased from 260° C. to 300° C., said iMVR measured at 300° C. with 5 kg load after a 15 min holding time at this temperature is less than 80 ml/10 min and said yellowness index is less than 17.

16. The polymer composition according to claim 6, comprising 3 to 40 parts by weight, based on the sum of components A and B, of component F).

* * * * *